3,381,045
CYCLODODECATRIENE 1,5,9 PROCESS
Theodore A. Koch and Herbert S. Eleuterio, Wilmington, Del., assignors to E. I. du Pont de Nemours and Company, Wilmington, Del., a corporation of Delaware
No Drawing. Continuation-in-part of application Ser. No. 468,104, June 29, 1965. This application May 23, 1966, Ser. No. 551,889
17 Claims. (Cl. 260—666)

This application is a continuation-in-part of U.S. application Ser. No. 468,104, filed June 29, 1965, by Theodore A. Koch and Herbert S. Eleuterio and now abandoned.

The present invention relates to a process for the trimerization of butadiene to cyclododecatriene-(1,5,9) (CDDT) using a catalyst prepared from an organoaluminum sesquichloride, water and certain tetravalent titanium compounds.

The production of cyclododecatriene-(1,5,9) by subjecting butadiene to the action of various catalysts is known. Butadiene trimerization catalysts, based on alkylaluminum chlorides and titanium halides, such as those described in Schneider et al., U.S. Patent No. 3,076,045, and Wilke, U.S. Patent No. 2,964,574 are known.

The present invention is an improvement both in rate of reaction, smoothness of operation and in ultimate yield over these above-mentioned prior processes involving the use of a certain catalyst system under certain reaction conditions.

The preferred catalyst system is prepared from certain hereinafter defined aluminum sesquichlorides, water and certain hereinafter defined titanium compounds. Catalyst components are preferably limited to these three. For convenience, the exact composition of the organometallic compound may be varied and described as any composition having the following ratio of composition:

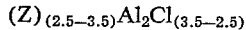

$$(Z)_{(2.5-3.5)}Al_2Cl_{(3.5-2.5)}$$

wherein Z is selected from the class consisting of alkyl radicals containing from 2 to 4 carbon atoms and the phenyl radical. The ratio of the aluminum sesquichloride to water should be maintained at from 1/0.3 (mole) to 1/0.9 (mole) when anhydrous butadiene is used as the starting material with from 1/0.4 to 1/0.7 being the especially preferred range. The organometallic compounds from this reaction between the aluminum sesquichloride and water in the aforementioned ratios have the approximate compositions of

$$(Z)_{2.4}Al_2Cl_3O_{0.3}$$

to

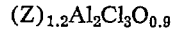

$$(Z)_{1.2}Al_2Cl_3O_{0.9}$$

Naturally, if the butadiene contains water, the amount of water added to the catalyst system should be adjusted so that at no time during the useful life of the catalyst system does the amount of water added exceed the 1/0.9 upper limit. The effect of the water is surprising since its effect on the present system is greater than on a system based on diethylaluminum chloride and since ethylaluminum dichloride is unsatisfactory for use in a similar trimerization process.

The ratio of the aluminum sesquichloride to titanium compound is not so critical. The molar ratio of the aluminum sesquichloride to titanium compound may be varied from 3/1 to 30/1 with ratios of from 5/1 to 15/1 being preferred. Higher ratios may be used but are not desirable because of the expense of the aluminum sesquichloride.

Generally speaking, any tetravalent titanium compound is operable in the present process as long as it is soluble in the reaction medium to an extent of at least 0.01 mole percent as based on cyclododecatriene-(1,5,9) at 20° C. and which compound does not contain a substituent which inactivates the aluminum sesquichloride catalyst. These compounds generally have the formula $TiA_4$ wherein A is selected from the class consisting of Cl, Br, I and OR, wherein R is a hydrocarbon radical of from 1 to 20 carbon atoms. The four A's used in a given titanium compound may be the same or different.

The catalyst may be made up by reacting water with the aluminum sesquichloride followed by reaction of the product so formed with titanium compound. However, for continuous operation, it is convenient to add all three catalyst components separately and simultaneously to the reaction vessel. If desired, all of the catalyst may be added as gases in separate butadiene streams as by vaporizing either the titanium compound or the aluminum compound and adding the vapor to separate butadiene streams.

The present process is also applicable to the trimerization of substituted butadienes such as isoprene.

In carrying out the present invention, preferably the water is added with a diluent. If the water is to be added in the liquid phase, it should be dissolved in an inert organic solvent such as benzene, cyclohexane, cyclododecatriene, or hexane. If the water is to be added in the gas phase, it should be a gas stream containing water vapor up to but not exceeding the saturation point, the gas being either butadiene or an inert gas such as nitrogen.

The butadiene trimerization reaction can be run in any inert organic solvent such as benzene, cyclohexane or hexane. Cyclododecatriene, the reaction product, is an excellent solvent and the preferred one for continuous operation. While use of a catalyst solvent is unnecessary, one may be used to facilitate addition of the catalyst and intimate contact of the reactants.

The butadiene trimerization reaction temperature generally is maintained at from 20 to 120° C. and preferably at from 60 to 90° C. At lower temperatures, the reaction rates become unduly slow and at higher temperatures, increasing yield losses to by-products occur.

Pressure is not a critical variable in the instant invention and may be varied from ½ atm. to 50 atm. preferably at from 1 to 5 atm.

By operating within the hereinabove set forth limits, butadiene trimer is formed at average reaction rates above 5.0 g./min./mole of $TiA_4$ present and generally in yields of from 85 to 95 percent.

When in continuous operation, the reaction may be carried out in multiple stages to take advantage of residual catalyst activity.

The following examples are illustrative of the invention.

Example I

A solution (8.7030 g.) of ethylaluminum sesquichloride containing 3.06 meq. of aluminum-ethyl bonds is placed in a 100 ml. flask fitted with a rubber stopper and hose connection, which has been flushed with dry, oxygen-free argon, and there is then added a solution of 18.18 mg. of water in 10 ml. of benzene at 60° C. (2.02 meq. of hydrogen). The flask is attached to a manifold and evacuated. The remaining aluminum-ethyl is decomposed with 10 ml. of 1 percent aqueous NaOH, the gas collected and determined manometrically. Found 1.07 meq. Therefore, 1.99 meq. lost by reaction with water. The error is 1.5 percent (2.02 meq.–1.99 meq.=.03 meq.=1.5 percent error). This example illustrates that within experimental error, when water is reacted with aluminum sesquichloride, chlorine is retained quantitatively and ethane is evolved quantitatively as long as there is an excess of aluminum-ethyl bonds.

Example II

Pure ethylaluminum sesquichloride (10.92 g., 44.2 mmoles) is dissolved in 60 ml. of dry, oxygen-free benzene, Argon containing 1.21 mmoles/liter of water at 24° C. is passed into the solution at a rate of .22 liter/minute, (.266 mmoles/minute) of water. After 100 minutes, the solution is found to contain 1.41 meq./gm. aluminum-ethyl bonds and 2.25 meq./gm. of chloride, (chlorine/ethyl)=1.60. The ratio of ethyl-aluminum sesquichloride to water is 1:0.56. The rate of water addition is actually 0.247 mmole/minute. This example illustrates the product which can be obtained by adding the water as vapor in a gas.

Examples III–XI

In each of Examples III to X, to a 2 liter 3-necked, creased, round-bottomed flask fitted with rubber stopper, condenser with outlet to a mercury bubbler, thermometer, high speed stirrer, and gas inlet, well dried and flushed with inert gas, are added 150 ml. of benzene dried and rendered oxygen-free by distillation from sodium-potassium alloy under nitrogen. The benzene is heated to 55° C.±5° C. and the solution of organometallic prepared as in Example II is injected with moderate agitation followed by 1 mmole of titanium tetrachloride as 10 ml. of a 0.1 M solution in benzene. The rate of stirring is then increased to 2,000 r.p.m. Butadiene, purified by stirring with and distillation from triisobutyl aluminum, is passed in slightly more rapidly than it is adsorbed to maintain a purge of a few cc./min. through the trap. The reaction temperature is maintained at 70±2° C. After the time stated in Table I, the catalyst is deactivated with a 10 ml. sample of a 1:1 mixture of acetone and isopropyl alcohol and a sample of the crude reaction mixture analyzed immediately by gas chromatography. The average rate of the reaction throughout a run is given as the number of g./min. of pure cyclododecatriene actually produced. Example XI illustrates the poor rate and yield obtained in the absence of water.

TABLE I

| Example | $Et_3Al_2Cl_3$:$H_2O$ Ratio | Mmoles of Al | Time (min.) | Yield CDDT, Percent | Rate, g./min. |
|---------|------|------|------|------|------|
| III | 1:1.01 | 16.0 | 42 | 50 | Slow |
| IV | 1:0.96 | 11.2 | 77 | 83 | 2.56 |
| V | 1:0.56 | 20.0 | 56 | 90.6 | 10.0 |
| VI | 1:0.39 | 20.0 | 57 | 89 | 6.65 |
| VII | 1:0.64 | 20.0 | 52 | 91 | 10.6 |
| VIII | 1:0.83 | 20.0 | 53 | 87.5 | 8.85 |
| IX | 1:0.71 | 20.0 | 56 | 90 | 8.4 |
| X | 1:0.47 | 20.0 | 44 | 92 | 9.5 |
| XI | 1:0.0 | 18.0 | 28 | 60 | 0.1 |

The yield data in the following examples have not been normalized to total 100 percent and reflect the usual variation in analytical accuracy.

Examples XII–XXXIV

A 500 cc. reaction vessel (except for Examples XXXIII and XXXIV in which a 1500 cc. reaction vessel is used) is equipped with inlets for continuous introduction of solutions of the aluminum sesquichloride and titanium compound, dry butadiene, and a small side stream of butadiene saturated with water vapor. In all of the examples, except Examples XXIII and XXXIV, the titanium compound is added as a 5–10 percent solution in cyclohexane. In all of the examples, the aluminum compound is added as a 20 percent solution in cyclohexane, except for Example XXIX which uses a 56 percent solution in chlorobenzene. In Example XXXIII, a 2.3 percent solution of titanium compound in CDDT is used. In Example XXXIV, a 8.8 percent solution of titanium compound in CDDT is used. In Examples XIII to XX, the feed rate of titanium compound in mmoles per gallon of reactor volume per hour is 5.32 which is equivalent to 1.01 g. of $TiCl_4$ per gallon of reactor contents per hour. In Example XII, the feed rate is 14.0 mmole of titanium per gallon of reactor contents per hour. In Example XXXIV, the feed rate is 2.14 mmole of titanium per gallon of reactor contents per hour. Liquid product is continuously removed such that steady state conditions prevail. The effect of variation of the aluminum sesquichloride/water/titanium compound ratios on rates and yields are reported in Table II.

TABLE II

|  | XII | XIII | XIV | XV | XVI | XVII |
|---|---|---|---|---|---|---|
| Molar Catalyst Ratio $Z_3Al_2Cl_3$:$TiA_4$:$H_2O$ | 3:1:1 | 7:1:3.5 | 8:1:4 | 10:1:5 | 15:1:7.5 | 20:1:10 |
| Z | $C_2H_5$- | $C_2H_5$- | $C_2H_5$- | $C_2H_5$- | $C_2H_5$- | $C_2H_5$- |
| A | Cl- | Cl- | Cl- | Cl- | Cl- | Cl- |
| Steady State Productivity, lbs. crude/gal. of crude in reactor/hr | 5.6 | 7.9 | 9.1 | 9.4 | 10.1 | 11.8 |
| Percent Distribution in Crude (corrected for butadiene and catalyst solvent): |  |  |  |  |  |  |
| Cyclododecatriene | 86.0 | 86.0 | 88.0 | 87.9 | 87.5 | 86.9 |
| Cyclooctadiene | 4.1 | 3.2 | 3.6 | 3.7 | 2.6 | 2.1 |
| Vinylcyclohexene | 1.3 | 1.5 | 1.6 | 1.7 | 1.5 | 1.1 |
| Non-volatile residue |  | 7.4 | 5.9 | 5.6 | 6.6 | 7.5 |
| Temperature, ° C | 85–90 | 75 | 75 | 75 | 75 | 75 |
| Pressure, p.s.i.g | 1 | 1 | 1 | 1 | 1 | 1 |
|  | XVIII | XIX | XX | XXI | XXII | XXIII |
| Molar Catalyst Ratio $Z_3Al_2Cl_3$:$TiA_4$:$H_2O$ | 30:1:15 | 10:1:0 | 15:1:4.5 | 15:1:6 | 5:1:2.5 | 5:1:1.25 |
| Z | $C_2H_5$- | $C_2H_5$- | $C_2H_5$- | $C_2H_5$- | $C_2H_5$- | $C_2H_5$- |
| A | Cl- | Cl- | Cl- | Cl- | Cl- | Cl- |
| Steady State Productivity, lbs. crude/gal. of crude in reactor/hr | 10.5 | 1.5 | 7.51 | 9.44 | 5.01 | 6.5 |
| Percent Distribution in Crude (corrected for butadiene and catalyst solvent): |  |  |  |  |  |  |
| Cyclododecatriene | 85.1 | 65.7 | 85.9 | 89.3 | 87.2 | 87.4 |
| Cyclooctadiene | 1.5 | 1.0 | 3.0 | 2.8 | 3.2 | 5.0 |
| Vinylcyclohexene | 0.9 | 4.8 | 1.2 | 1.4 | 1.4 | 2.1 |
| Non-volatile residue | 9.2 | 23.8 | 8.7 | 8.0 | 9.4 | 6.3 |
| Temperature, ° C | 75 | 75 | 75 | 75 | 75 | 75 |
| Pressure, p.s.i.g | 1 | 1 | 1 | 1 | 1 | 1 |
|  | XXIV | XXV | XXVI | XXVII | XXVIII | XXIX |
| Molar Catalyst Ratio $Z_3Al_2Cl_3$:$TiA_4$:$H_2O$ | 10:1:5 | 10:1:5 | 10:1:5 | 10:1:5 | 10:1:5 | 10:1:5 |
| Z | $C_2H_5$- | $C_2H_5$- | $C_2H_5$- | $CH_3CH_2CH_2$- | $(CH_3)_2CHCH_2$- | $C_6H_5$- |
| A | Cl- | Cl- | Cl- | Cl- | Cl- | Cl- |
| Steady State Productivity, lbs. crude/gal. of crude in reactor/hr | 7.23 | 7.22 | 8.65 | 8.02 | 4.59 | 8.83 |
| Percent Distribution in Crude (corrected for butadiene and catalyst solvent): |  |  |  |  |  |  |
| Cyclododecatriene | 85.4 | 86.9 | 85.8 | 84.5 | 83.7 | 78.6 |
| Cyclooctadiene | 1.1 | 1.7 | 3.6 | 4.8 | 4.2 | 9.4 |
| Vinylcyclohexene | 0.8 | 1.0 | 1.6 | 2.1 | 1.9 | 2.2 |
| Non-volatile residue | 11.2 | 9.4 | 7.5 | 5.9 | 8.9 | 9.1 |
| Temperature, ° C | 50 | 60 | 80 | 75 | 75 | 75 |
| Pressure, p.s.i.g | 1 | 1 | 1 | 1 | 1 | 1 |

TABLE II—Continued

| | XXX | XXXI | XXXII | XXXIII | XXXIV |
|---|---|---|---|---|---|
| Molar Catalyst Ratio $Z_3Al_2Cl_3:TiA_4:H_2O$ | 10:1:5 | 10:1:5 | 10:1:5 | 10:1:4.4 | 20:1:8.8 |
| Z | $C_2H_5-$ | $C_2H_5-$ | $C_2H_5-$ | $C_2H_5-$ | $C_2H_5-$ |
| A | $(CH_3)_2CHO-$ | $CH_3(CH_2)_3CH(C_2H_5)CH_2O-$ | $n-C_4H_9O-$ | $I-$ | $Br-$ |
| Steady State Productivity, lbs. crude/gal. of crude in reactor/hr | 7.61 | 7.21 | 7.52 | 8.40 | 7.50 |
| Percent Distribution in Crude (corrected for butadiene and catalyst solvent): | | | | | |
| Cyclododecatriene | 85.2 | 87.2 | 86.1 | 90.8 | 87.0 |
| Cyclooctadiene | 3.9 | 4.1 | 4.3 | 2.5 | 2.7 |
| Vinylcyclohexene | 2.2 | 1.9 | 2.4 | 1.2 | 1.3 |
| Non-volatile residue | 5.8 | 5.0 | 5.2 | 5.1 | 8.2 |
| Temperature, °C | 75 | 75 | 75 | 75 | 75 |
| Pressure, p.s.i.g | 1 | 1 | 1 | 1-1.5 | 1-1.5 |

Cyclododecatriene is a valuable chemical intermediate which can be readily oxidized to succinic acid which is useful in the production of plastics such as polyamides. It also may be hydrogenated in known manner. Thus, cyclododecene or cyclododecane is obtained from cyclododecatriene. These hydrogenated products may, in turn, be oxidized in known manner to form the corresponding dicarboxylic acids.

We claim:

1. A process for the production of cyclododecatriene-(1,5,9), which consists essentially of contacting a catalyst formed by reacting a compound having the composition $$Z_{2.4-1.2}Al_2Cl_3O_{0.3-0.9}$$

wherein Z is selected from the class consisting of alkyl radicals containing from 2 to 4 carbon atoms and the phenyl radical, with a titanium compound of the formula $TiA_4$, wherein A is selected from the class consisting of Cl, Br, I, and OR wherein R is a hydrocarbon radical of from 1 to 20 carbon atoms, in an amount such that the molar ratio of the aluminum compound to the titanium compound is maintained at from 3:1 to 30:1, with butadiene and carrying out the reaction at a temperature of from 20 to 120° C., and recovering cyclododecatriene.

2. A process for the production of cyclododecatriene-(1,5,9), which consists essentially of charging a reactor with an aluminum compound of the structure $$Z_{2.5-3.5}Al_2Cl_{3.5-2.5}$$

wherein Z is selected from the class consisting of alkyl radicals containing from 2 to 4 carbon atoms and the phenyl radical, with from 0.3 to 0.9 mole of water per mole of aluminum compound, said water being introduced in a form selected from the class consisting of a solution in an inert organic solvent and as a vapor in a gas selected from the class consisting of an inert gas and butadiene, a titanium compound of the formula $TiA_4$ wherein A is selected from the class consisting of Cl, Br, I, and OR wherein R is an organic radical of from 1 to 20 carbon atoms, in an amount such that the molar ratio of the aluminum compound to the titanium compound is maintained at from 3:1 to 30:1, and butadiene and carrying out the reaction at a temperature of from 20 to 120° C. and recovering cyclododecatriene-(1,5,9).

3. The process of claim 1 wherein the cyclododecatriene-(1,5,9) is recovered at a rate in excess of 5 grams per minute per millimole of the titanium compound present.

4. The process of claim 2 wherein the cyclododecatriene-(1,5,9) is recovered at a rate in excess of 5 grams per minute per millimole of the titanium compound present.

5. The process of claim 3 wherein the molar ratio of the aluminum compound to the titanium compound is from 5:1 to 15:1.

6. The process of claim 4 wherein the molar ratio of the aluminum compound to the titanium compound is from 5:1 to 15:1.

7. The process of claim 5 wherein the titanium compound is titanium tetrachloride.

8. The process of claim 6 wherein the titanium compound is titanium tetrachloride.

9. The process of claim 5 wherein the aluminum compound is ethylaluminum sesquichloride and the cyclododecatriene-(1,5,9) is recovered in a yield in excess of 85 percent as based on the butadiene.

10. The process of claim 6 wherein the aluminum compound is ethylaluminum sesquichloride and the cyclododecatriene-(1,5,9) is recovered in a yield in excess of 85 percent as based on the butadiene.

11. The process of claim 7 wherein the aluminum compound is ethylaluminum sesquichloride and the cyclododecatriene-(1,5,9) is recovered in a yield in excess of 85 percent as based on the butadiene.

12. The process of claim 8 wherein the aluminum compound is ethylaluminum sesquichloride and the cyclododecatriene-(1,5,9) is recovered in a yield in excess of 85 percent as based on the butadiene.

13. The process of claim 12 wherein the water is introduced into the reactor as a vapor in butadiene.

14. The process of claim 4 wherein from 0.4 to 0.7 mole of water per mole of ethylaluminum sesquichloride is used.

15. The process of claim 13 wherein from 0.4 to 0.7 mole of water per mole of ethylaluminum sesquichloride is used.

16. The process of claim 15 wherein the titanium tetrachloride is charged to the reactor as a gas.

17. The process of claim 16 wherein the ethylaluminum sesquichloride is vaporized and the vapor charged to the reactor.

References Cited

UNITED STATES PATENTS 3,076,045   1/1963   Schneider _____ 260—666

FOREIGN PATENTS 928,812   6/1963   Great Britain.
987,423   3/1963   Great Britain.

DELBERT E. GANTZ, *Primary Examiner.*

PAUL M. COUGHLAN, JR., *Examiner.*

V. O'KEEFE, *Assistant Examiner.*